July 28, 1959  G. ANDERMANN ET AL  2,897,367
SPECTROSCOPY
Filed April 25, 1956  3 Sheets-Sheet 1
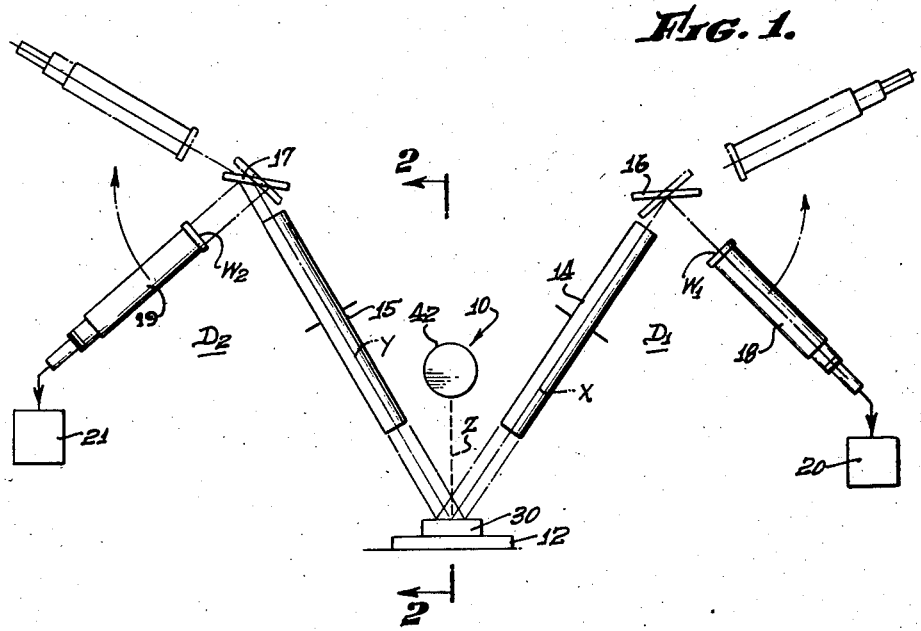
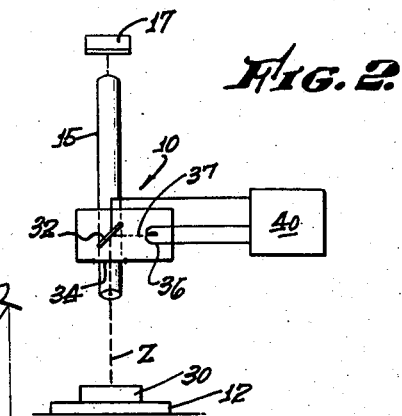
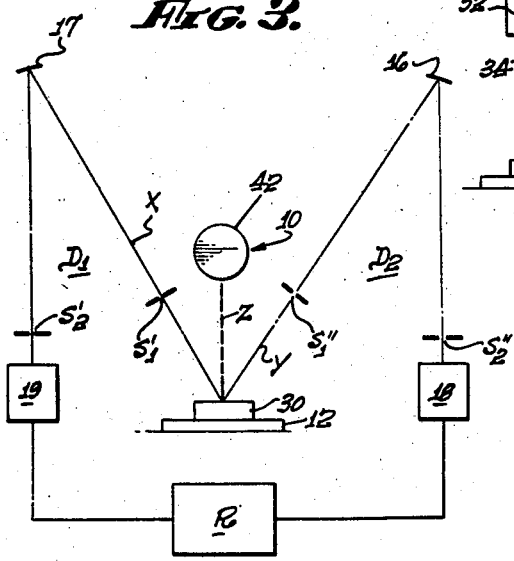
GEORGE ANDERMANN,
JOSEPH WESLEY KEMP,
INVENTORS.
BY
ATTORNEY.

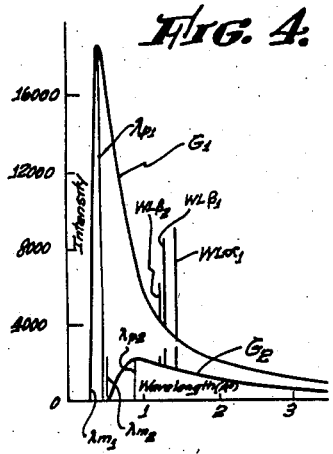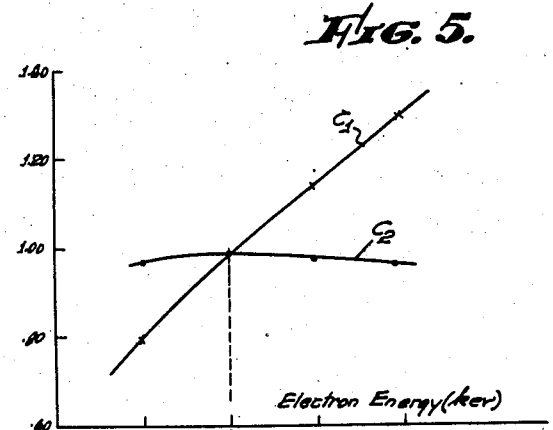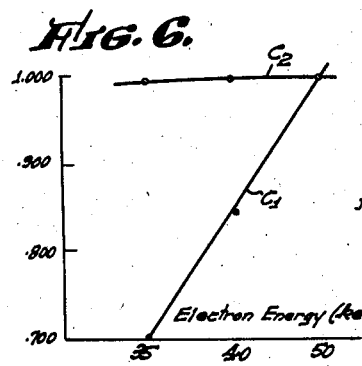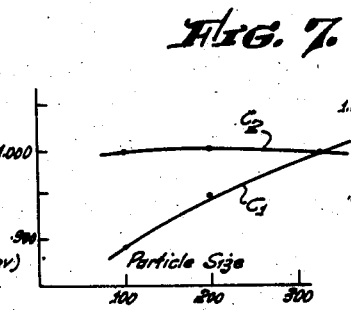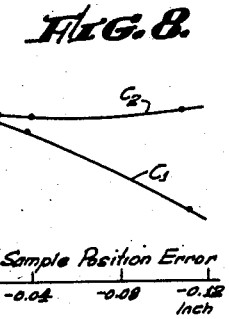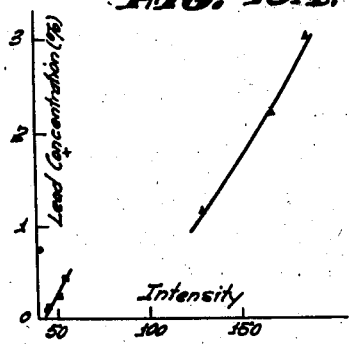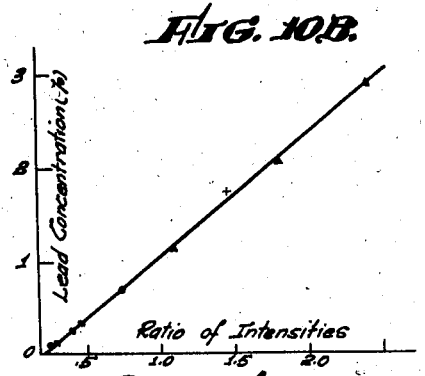

July 28, 1959   G. ANDERMANN ET AL   2,897,367
SPECTROSCOPY
Filed April 25, 1956   3 Sheets-Sheet 3
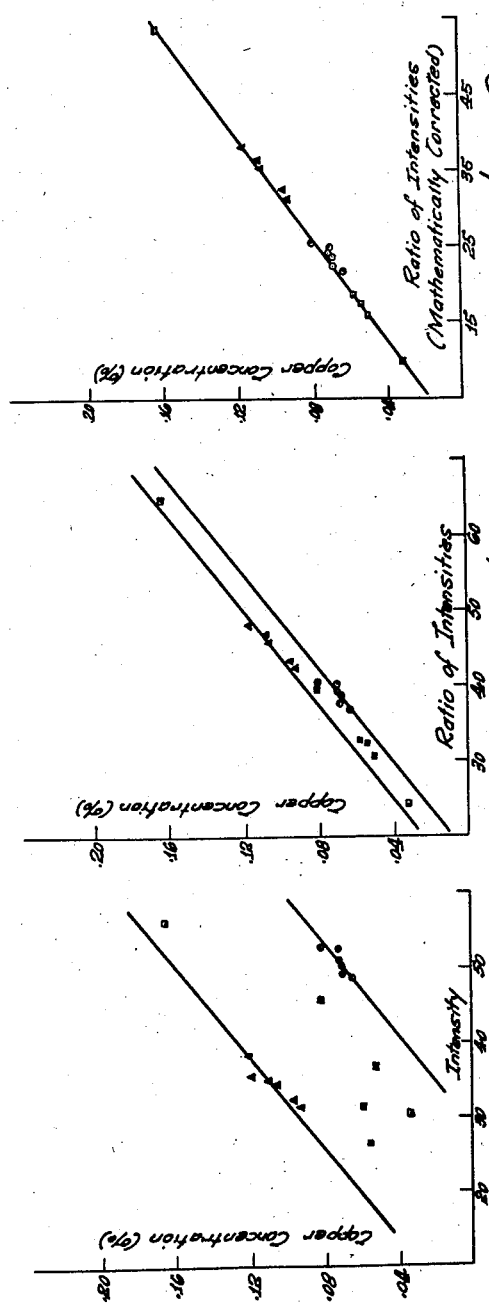
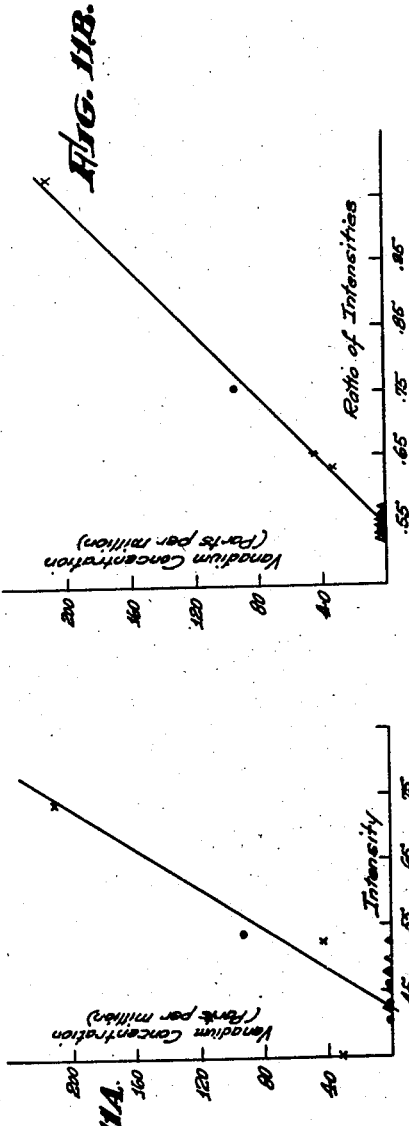
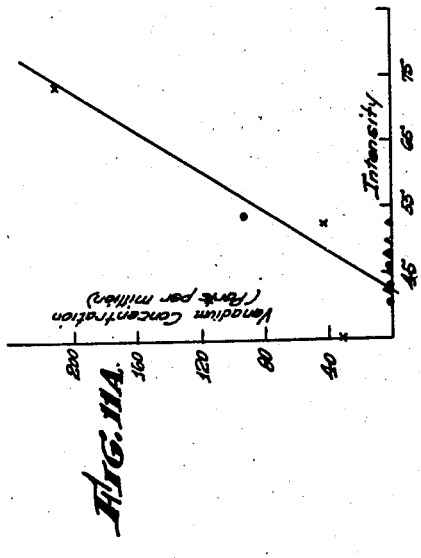
GEORGE ANDERMANN,
JOSEPH WESLEY KEMP,
INVENTORS.
BY Fred B. Lawlor
ATTORNEY.

United States Patent Office 2,897,367
Patented July 28, 1959

2,897,367

SPECTROSCOPY

George Andermann, Los Angeles, and Joseph Wesley Kemp, La Canada, Calif., assignors, by mesne assignments, to Applied Research Laboratories, Inc., Glendale, Calif., a corporation of Delaware Application April 25, 1956, Serial No. 580,583

14 Claims. (Cl. 250—53)

This invention relates to improvements in X-ray spectroscopy, and more particularly to improved methods of determining the compositions of ores, alloys, and other mixtures that include one or more heavy elements.

Though the invention may be applied in many other ways, it is described herein with particular reference to the analysis of ores, tailings, concentrates, and slags that are encountered in mining operations.

For convenience, the element whose concentration is to be determined is referred to herein as the "analyte" and the balance of the sample is referred to herein as the "gangue."

X-ray spectroscopy has been employed for many years in the analysis of ores to determine the concentration of a valuable element therein in a series of related samples. In such a method, a sample of the ore is exposed to a heterochromatic beam of X-rays. Certain of these X-rays are absorbed by the analyte and are reemitted therefrom as a series of monochromatic lines. The absorption and reemission are due to a fluorescence process in which energy of X-rays of one or more wavelengths is absorbed and is then reemitted at a longer wavelength. The intensity of one or more of such fluorescent lines that are characteristic of the analyte is measured in order to determine the concentration of the analyte.

Various methods have been employed in the past to avoid or reduce errors of the type mentioned above. In one such prior method, a known amount of an element different from the analyte is added to the sample. The element added for this purpose is generally one which possesses a characteristic line having a wavelength close to that of the characteristic line being employed to measure the concentration of the analyte. In this system, the intensity of both characteristic lines, namely, the characteristic line of the analyte and the characteristic line of the added element, are measured. A comparison of these intensities and information regarding the concentration of the added element is employed to determine the concentration of the analyte. This technique has the disadvantage that it requires careful weighing and mixing of the sample and the added material. This technique is sometimes referred to as the "internal standard technique." This technique is particularly satisfactory for the analysis of samples that are in liquid or powder form.

In another technique, which is particularly applicable to solid, unpulverized samples, measurements are made of the intensities of characteristic lines associated with numerous constituents present in the sample. The calibration technique employed in this instance requires the preparation of a large number of samples of known composition approximating the compositions of the samples which are to be investigated. Measurements are made at various characteristic wavelengths, and the analysis is completed by a mathematical method of successive approximations. This method is even more tedious to employ than the former.

Errors often arise in the determination of the concentration because the intensity of the fluorescent line depends not only on the concentration of the analyte, but also on the intensity of the incident beam, on the sizes of the particles of the sample undergoing analysis, and on errors or irregularities in the location of the sample relative to the beam source or to other parts of the apparatus. Errors also arise at times because the intensity of the line being detected varies from sample to sample because of unknown and uncontrolled fluctuations in the concentrations of other elements present in the samples.

Where an element of variable concentration interferes with the accuracy of the determination of the concentration of the analyte, the phenomenon is referred to as the "inter-element effect." Errors produced by the inter-element effect arise partly because of the absorption of incident radiation by the interfering element, partly because the interfering element absorbs the characteristic line of the analyte that is being detected, or partly because the interfering element itself emits characteristic radiation which is absorbed by the analyte and is reemitted by the analyte at the characteristic wavelength. In both of the former cases, the intensity of the characteristic line of the analyte is diminished by the interfering element. In the latter case, it is enhanced. Not all elements present in the gangue produce an inter-element effect.

In accordance with our invention, the effects of variations in intensity of a characteristic line of an analyte are eliminated or at least greatly reduced, whether those variations arise because of unknown or uncontrolled variations in the instrument or in the sample, without requiring the addition of an internal standard to the sample and without the necessity of resorting to a complex method of successive approximations.

In the best mode of practicing our invention so far discovered, a sample under investigation is exposed to a broad band of X-rays that overlap the X-ray absorption region of the analyte; a first beam of X-rays emerging from the sample at a wavelength characteristic of the X-ray emission spectrum of the analyte is detected; a second beam of X-rays emerging from the sample in said band but excluding wavelength characteristic of emission of any elements present is also detected; and the ratio of the intensity of the first beam compared with that of the second beam is measured to determine the concentration of the analyte.

The first beam of X-rays is sometimes referred to herein as the "analyte beam," while the second beam is sometimes referred to herein as the "monitor beam." Usually the first beam is made monochromatic so as to minimize interfering effects of radiation that is not characteristic of the analyte. The second beam is also usually made monochromatic, and in any event the band of wavelengths of the monitor beam is so selected as to preclude errors from radiation at wavelengths characteristic of any element present. Usually the monitor beam consists solely of scattered radiation in a wavelength band free of any strong absorption bands or emission lines characteristic of any elements present.

Usually, it is possible to select the characteristic line of the analyte beam in such a way that no inter-element effect occurs. For example, in an ore in which the principal valuable metal present is iron, measurements of the intensity of the K line of the iron X-ray spectrum will not be affected substantially by lighter elements that are normally present, such as oxygen, carbon, calcium, sulphur, or silicon. In other cases, however, other heavy elements may be present which have strong X-ray absorption bands that overlap the emission lines of the analyte or which have emission lines that lie within strong absorption bands of the analyte, thus making it necessary to make corrections for the inter-element effect. In any event, the use of our invention simplifies the accurate analysis of mixtures and reduces the time and expense of making such analyses.

Examples of the application of this invention are set forth in the following description and in the accompanying drawings.

In the drawings:

Figure 1 is an elevational view of an X-ray spectrometer that may be employed in the practice of this invention;

Fig. 2 is a cross-sectional view of the spectrometer taken on the plane 2—2 of Fig. 1;

Fig. 3 is an elevational view of an alternative form of X-ray spectrometer that may be employed in the practice of the invention;

Fig. 4 is a graph representing a source spectrum; and

Figs. 5 to 11 inclusive are graphs illustrating the application of the invention.

Referring to Figs. 1 and 2, there is illustrated a multiple-line X-ray spectrometer that may be employed in the practice of this invention. The spectrometer includes a source 10 of X-rays, a sample holder 12, a pair of collimators 14 and 15, a pair of dispersing elements 16 and 17, a pair of detectors 18 and 19, and a pair of measuring devices 20 and 21, all connected and arranged to detect and measure the intensities of X-rays at two different selected wavelengths. A sample 30 to be analyzed is placed on the sample holder 12 beneath the X-ray source 10 and at a position where the axes of the two collimators 14 and 15 intersect. X-rays emerging from the sample 30 at two different wavelengths are detected by the two detectors 18 and 19, and the ratio of the intensities of the X-rays is measured.

The X-ray source 10, which is of conventional type, comprises a target 32 arranged directly above the sample holder and at a position from which the target may direct X-rays through a window 34 toward the sample 30 as a broad beam along an axis Z which intersects the axes X and Y of the collimators 14 and 15. The X-ray source 10 also includes a heated cathode 36 from which a beam 37 of accelerated electrons flows to the target 32 in order to generate the X-rays. A power supply 40 is employed to provide suitable electrical potentials to the target 32 and to the cathode 36 in order to generate X-rays of the desired wavelengths and at the desired intensity. As shown in Figs. 1 and 2, the tube 42 of the X-ray source is located above the sample holder 12, and the two collimators 14 and 15 are arranged symmetrically and in a common plane.

The collimator 14, the dispersing element 16, and the Geiger counter 18 constitute a single monochromatic X-ray detector unit $D_1$. Likewise, the collimator 15, the dispersing element 17, and the Geiger counter 19 constitute a second monochromatic X-ray detector unit $D_2$. The two collimators 14 and 15 are of conventional type and may be in the form of a series of parallel spaced-apart plates that are adapted to permit the radiation emerging from the sample 30 to strike the corresponding dispersing elements 16 and 17 only if the radiation travels thereto along a direction very nearly parallel to the axes X and Y respectively. Thus, in effect, the beams of X-rays that emerge from the respective collimators 14 and 15 and which are transmitted by them to the dispersing elements 16 and 17 are substantially plane parallel beams. The dispersing elements 16 and 17 are in the form of flat crystals, such as crystals of lithium fluoride.

Each of the Geiger counters 18 and 19 is provided with an entrance window $W_1$ and $W_2$ respectively, through which radiation can be transmitted into a gas-filled chamber. The crystal 16 and the Geiger counter 18 are adjustably mounted so that when they are set in any particular angular predetermined position relative to the collimator 14, a monochromatic beam of X-rays, that is, a beam of X-rays in a very narrow band at one wavelength, enters the window $W_1$ and is detected by the Geiger counter 18. In a similar way, the crystals 17 and the Geiger counter 19 are adjustably mounted so that when they are set in any particular predetermined angular position relative to the collimator 15, a monochromatic beam of X-rays enters the window $W_2$ and is detected by the Geiger counter 19. The measuring device 20, which is connected to the output of the Geiger counter 18, is employed to indicate the intensity of the beam of X-rays of a first wavelength $\lambda_1$ emerging from the sample 30. In a similar way, the measuring device 21, which is connected to the output of the Geiger counter 19, is employed to indicate the intensity of the beam of X-rays of a second wavelength $\lambda_2$ emerging from the sample 30. Though the readings of the measuring devices 20 and 21 depend upon the wavelength of the radiation entering the windows of the corresponding Geiger counters, nevertheless at any single wavelength the measurement indicated by each of the devices 20 and 21 is directly proportional to the intensity of the beam of X-ray radiation of that wavelength emerging from the sample 30. Thus, at the corresponding wavelength of X-rays being detected, each of the devices measures the intensity of the radiation emerging from the sample at that wavelength. The ratio of the beam intensities is determined by dividing one measurement by the other.

The X-ray spectrometer described above is merely one of many which may be employed in the practice of this invention. Thus, in the spectrometer described above, collimators 14 and 15 have been employed, together with flat crystals 16 and 17, to monochromatize X-rays emerging from the sample so as to direct monochromatic X-ray beams toward the windows $W_1$ and $W_2$ of the Geiger counters 18 and 19. It will be understood, however, that the beams may be monochromatized in other ways. Furthermore, detector units other than Geiger counter units may be employed to detect the monochromatized X-ray beams. It will also be understood that numerous systems are available for measuring the intensities of the detected beams. Furthermore, other types of X-ray sources may be employed.

An X-ray spectrometer employing curved crystals is illustrated in Fig. 3. In this spectrometer, the first detector unit $D_1$ has parallel entrance and exit slits $S_1'$ and $S_2'$, and the curved crystal 17 is located at a position at which rays entering the exit slit $S_1'$ are focused at the exit slit $S_2'$. Likewise, the second detector unit $D_2$ has a curved crystal 16 which is similarly arranged with respect to an entrance slit $S_1''$ and exit slit $S_2''$. As is well known, by adjusting the angular positions of the crystals 16 and 17 relative to the corresponding entrance and exit slits, a beam of X-rays of different predetermined wavelengths $\lambda_1$ and $\lambda_2$ can be focused upon the corresponding exit slit. In this spectrometer, as in the former, the ratio of the intensities of the two beams is determined directly by means of a ratio meter connected to the outputs of Geiger-Muller counters 18 and 19, which in this case are located opposite the exit slits $S_2'$ and $S_2''$.

The first wavelength $\lambda_1$ is the wavelength of the analyte line and is sometimes referred to hereinafter as the analyte wavelength. The second wavelength $\lambda_2$ is the wavelength of the monitor beam and is sometimes referred to hereinafter as the monitor wavelength. Also, in some cases the ratio of intensities of the analyte line to the monitor line is referred to simply as the ratio measurement.

The manner in which the wavelengths $\lambda_1$ and $\lambda_2$ are selected and the manner in which the ratio measurements are employed to determine the concentration of an analyte in the sample 30 are illustrated and described hereinafter.

The spectrum of X-rays emerging from the X-ray source 10 and directed to a sample 30 depends upon the voltage to which the electrons striking the target 32 have been accelerated. Typical spectra of an X-ray source are represented in Fig. 4, where abscissae represent wavelength and ordinates represent beam intensity at the various wavelengths. In Fig. 4, graph $G_1$ is the spectrum of X-rays produced when 50 k.e.v. electrons bombard the target 32, while graph $G_2$ represents the spectrum of X-rays produced when 24 k.e.v. electrons bombard the target. The abbreviation "k.e.v." represents the unit of energy equal to the energy acquired by an electron which has been accelerated through a field across which the potential is 1000 volts.

It is to be noted that each of the graphs of Fig. 4 has a peak intensity. The wavelength $\lambda_p$ at which this peak occurs decreases as the energy of the electrons increases. It will also be noted that each of these spectra is characterized by a minimum wavelength $\lambda_m$ below which no X-rays are produced. Each curve rises sharply from the corresponding minimum wavelength $\lambda_{m1}$ or $\lambda_{m2}$ to the corresponding peak wavelength $\lambda_{p1}$ or $\lambda_{p2}$ and then diminishes in a somewhat hyperbolic manner. In other words, the intensity of the X-rays per unit wavelength at any wavelength increases rapidly from the minimum wavelength to the peak wavelength, and above the peak wavelength the intensity diminishes asymptotically to zero at infinite wavelengths. Superposed on each of the graphs $G_1$ and $G_2$ is a line spectrum representing the X-ray emission spectrum of the metal of which the target is comprised. In the graph illustrated, the line spectrum represents three lines of the X-ray spectrum of tungsten. Usually, though not necessarily, the material of which the target 32 is composed consists of an element different from any element that is expected to be found in the sample undergoing analysis. The energy of the electron beam is so selected that the threshold wavelength $\lambda_m$ of the source spectrum is lower than the wavelengths $\lambda_1$ and $\lambda_2$ of the X-rays to be detected.

In accordance with this invention, one of the detector units $D_1$ is set to monochromatize X-rays emerging from the sample as one monochromatic beam at one wavelength $\lambda_1$ characteristic of the analyte, and the intensity of that beam is measured. And the other detector unit $D_2$ is set to monochromatize X-rays to produce a second monochromatic beam of a different wavelength $\lambda_2$.

In the best embodiment of the invention, the monitor wavelength is so selected that the ratio of the intensity of the analyte beam to the intensity of the monitor beam is a function of the concentration of the analyte alone, even though the intensity of the analyte line itself depends upon some unknown or uncontrolled or unmeasured factor. In the examples given, the monitor wavelength is so selected that for any given concentration of the analyte the ratio of the intensities of the analyte and monitor lines is independent of changes in any uncontrolled or unmeasured or undetermined factor that varies between the samples undergoing investigation. The wavelength of the monitor line is so selected that it differs from wavelengths at which any strong absorption or emission characteristic of an element in the sample occurs. The wavelength may be chosen from a general knowledge of the X-ray spectra of components likely to be present in the sample. It may also be chosen by making measurements at a series of closely spaced wavelengths in the sample and by selecting for the monitor beam a band of wavelengths at which no peak or valley appears in the spectrum. The monitor beam so selected consists of scattered radiation.

Though the invention is described with reference to specific applications in which the monitor beam is monochromatic, it will be understood that this beam is not necessarily monochromatic, but may include wavelengths over a wide range or band. Likewise, though the invention is described with reference to a system in which single monochromatic analyte lines are detected and measured, it will be understood that it is also applicable to systems in which polychromatic emission characteristic of the analyte is detected and measured.

The following typical examples illustrate the application of the invention. In Examples I and II, the energy of the electron beam of the X-ray source was permitted to vary. In the others, this energy was maintained substantially constant by employing a regulated voltage supply set to subject the electrons to an accelerating voltage of about 45 to 50 kv. In each example, the samples under investigation were placed upon the sample holder 12, X-rays were generated by accelerating electrons in the electron beam 37 to the energy specified and bombarding the target 32 with the beam, and the two X-ray monochromators $D_1$ and $D_2$ were arranged to detect and measure X-rays in narrow wavelength bands at the wavelengths specified hereinafter. Usually the width of the band both at the analyte wavelength and at the monitor wavelength was of the order of 0.01 A.

EXAMPLE I

Fig. 5 is a graph representing the results of applying the invention to the measurement of the concentration of iron in an ore sample when the energy of the electron beam is varied. The ore was ground to pass 100 mesh. In this case, abscissae represent electron beam accelerating voltage, while ordinates represent the values of the corresponding measurements compared with the measurement obtained when 40 kev. electrons were employed. Curve $C_1$ represents the manner in which the intensity of the detected monochromatic beam varied as a function of voltage when only the intensity of the iron K$\alpha$ line was being measured. This analyte line, as is well known, has a wavelength of 1.94 A. Curve $C_2$ represents the manner in which the ratio measurement varied when measurements were made with one detector $D_1$ set at the wavelength $\lambda_1$ of the iron K$\alpha$ line and the other detector $D_2$ set to measure the intensity of scattered radiation at a wavelength $\lambda_2$ of 2.0 A. It is to be noted that in the first case represented by curve $C_1$ the intensity of the analyte line varied greatly as the accelerating voltage of the electrons was changed, but that in the second case represented in curve $C_2$ the ratio of the beam intensities at the two wavelengths was very nearly constant over a wide range.

This graph demonstrates how the use of ratio measurements automatically eliminates errors that might otherwise occur if uncontrolled or unknown fluctuations in voltage occur when a sample is undergoing analysis.

EXAMPLE II

Fig. 6, which is similar to Fig. 5, represents the results of applying the invention to the determination of the concentration of copper in an ore sample when the energy of the electron beam is varied. The wavelength $\lambda_1$ of the copper K$\alpha$ line that was detected is 1.54 A. The wavelength $\lambda_2$ of the monitoring line of the scattered radiation that was detected was 2.0 A. In this case, too, wide variations in the measurements were obtained in the measurement of the analyte line intensity, as indicated by curve $C_1$. However, when the ratio of the K$\alpha$ line is measured with reference to scattered radiation of 2.0 A., the variation is very small, as indicated by curve $C_2$.

EXAMPLE III

Fig. 7 is a graph representing the results of applying the invention to the determination of the concentration of copper, in a series of ores of different particle size. Abscissae represent particle size expressed in terms of screen mesh, while ordinates represent variations of the measurement from a standard value obtained when the particles were of such a size as to pass a 325 mesh screen. In this graph, curve $C_1$ represents how the intensity of the copper K$\alpha$ line varied with particle size. Also in this figure, curve $C_2$ represents how the intensity of the copper K$\alpha$ line varied compared with the intensity of a monitoring line having a wavelength $\lambda_2$ of 1.44 A.

This graph demonstrates how the use of ratio measurements automatically eliminates errors that might otherwise occur if the particle size is not accurately controlled.

EXAMPLE IV

Fig. 8 is a graph representing the results of applying the invention to the determination of copper concentration in the same copper ore when the position of the sample is varied. In this particular instance, the sample was located approximately 2.5 inches from the nearermost ends of the entrance slits of a curved crystal spectrometer and about the same distance from the target 32 of the X-ray source 10. In this case, abscissae represent displacement of the sample from such a standard position expressed in inches, while ordinates represent the value of the measurement obtained. In this case, curve $C_1$ shows how the intensity of the copper $K\alpha$ line varied with displacement of the sample. In a similar way, the curve $C_2$ represents the manner in which the ratio of the intensity of the copper $K\alpha$ line varied in terms of the intensity of monitoring radiation having a wavelength $\lambda_2$ of 1.44 A. It is to be noted that in the first case a small variation in the sample position results in large errors of the analyte line intensity, while in the second case only small variations in the ratio measurements occurred.

This graph demonstrates how the use of ratio measurements automatically eliminates errors that might otherwise occur if the sample is not accurately positioned.

EXAMPLE V

Fig. 9 is a graph representing the results of applying the invention to the determination of the concentration of copper present in a variety of nickel ores and related mixtures that also contain an interfering element such as iron. This figure consists of three parts. Fig. 9A represents measurements of the intensity of the copper $K\alpha$ line plotted as abscissae against copper concentration as ordinates. Fig. 9B represents the ratio of the intensity of the copper $K\alpha$ line to the intensity of a monitoring beam having a wavelength of 0.56 A. plotted against copper concentration. Fig. 9C is similar to Fig. 9B, but is adjusted mathematically for inter-element effects.

In Fig. 9, the data plotted as points enclosed within circles represent the measurements obtained on low grade nickel ores. The points enclosed within squares represent data obtained from the analysis of mineralized gabbros from the same mining area. Also, the points enclosed within triangles represent data for slags obtained from the treatment of the ores and gabbros. The concentrations of possible interfering elements in these mixtures are indicated in Table I.

*Table I*

|   | Fe | Ni | Co |
|---|---|---|---|
|   | Percent | Percent | Percent |
| A ⊙ | 10 | 0.1 |  |
| B ☐ | 15-25 | 0.2 |  |
| C △ | 35 | 0.2 | 0.1 |

Ordinates $Y_C$ in Graph 9C may be obtained from the ordinates $Y_B$ of Fig. 9B by employing a background correction and then using the following formula:

$$X_c = X_b e^{0.005 C_{Fe}} \quad (1)$$

where $C_{Fe}$ = iron concentration in percent

No correction was required for the small amounts of nickel and cobalt present.

It is to be noted in this case that by measuring the ratio of the copper $K\alpha$ line intensity to the intensity of the X-rays at 0.56 A., the range of the data is greatly reduced, and that by applying inter-element corrections to the latter data, a very close correlation is obtained between the intensity ratio measurements and the copper concentration.

The coefficient 0.005 of the iron concentration $C_{Fe}$ of Equation 1 was determined experimentally. Once, however, having made this determination for a set of samples from the mine from which the nickel ores, the gabbros, and the slags were obtained, such coefficient could be employed in future analyses by determining the iron concentration by a supplemental method, whether it be a chemical method, an X-ray spectroscopic method, or some other method.

But, as is readily seen from a comparison of Figs. 9A and 9B, even without determining the iron concentration, a great improvement is obtained by the use of the ratio method of this invention. Thus, by making a ratio measurement on an unknown specimen from the mine, a fairly accurate determination of the copper content can be made by reference to Fig. 9B, even though the quantity of iron present is undetermined. For example, if the ratio measurement is 40, the copper concentration is very nearly 0.080.

EXAMPLE VI

Fig. 10 is a graph representing the results of applying the invention to the measurement of the lead concentration in mixtures from a particular mine. Fig. 10A represents a plot of the intensity of the lead $L\alpha_1$ line against lead concentration. Fig. 10B represents the ratio of the intensity of the lead $L\alpha_1$ line compared with the intensity of scattered radiation at 0.56 A. plotted against lead concentration. The wide scatter of points in Fig. 10A shows a great contrast with the linear plot represented in Fig. 10B. In both Figs. 10A and 10B, the points circumscribed by circles represent data obtained from tailings. Points circumscribed by squares and triangles represent synthetic mixtures composed of tailings and concentrates. The points represented by + signs represent zinc concentrates. The points represented by + signs circumscribed by circles represent iron concentrates. Table II below represents the range of iron and zinc concentrations in these various samples.

*Table II*

|   | Fe | Zn |
|---|---|---|
|   | Percent | Percent |
| A ⊙ | 0-1 | 0-1 |
| B ☐ | 1-7 | 0-1 |
| C △ | 1-7 | 2-6 |
| D + | 4-7 | 60 |
| D ⊕ | 40 | 1 |

It is to be noted that in this case there is a wide scatter of data when the intensity of the lead $L\alpha_1$ line is plotted against lead concentration, but that this scatter is almost entirely eliminated when the ratio of the intensity of the lead $L\alpha_1$ line to the intensity of the monitoring line is plotted against lead concentration. In this case, no mathematical correction for inter-element effects was necessary. The compensation was obtained automatically by taking the ratio of the measurement of the $L\alpha_1$ line to the measurement of the monitoring line. In this case, then, it is apparent that once the calibration curve of Fig. 10B has been obtained, no measurements of the iron and zinc concentrations of any of the samples from this mining operation need be made to ascertain the concentration of lead in the samples. In this case, when the ratio measurement for an unknown sample is 1.0, the lead concentration is very nearly 1.1%.

EXAMPLE VII

Fig. 11 is a graph representing the results of applying the invention to the measurement of the vanadium concentration in the feed stock supplied to a cracking plant distillation unit and in the bottoms or residue resulting from the distillation process.

Fig. 11A represents a plot of the intensity of the vanadium $K\alpha_1$ line compared with the intensity of scattered radiation having a wavelength of 1.59 A. plotted against vanadium concentration. In both Figs. 11A and 11B, points circumscribed by circles represent data for liquid feed stock samples, points circumscribed by triangles represent data for solid feed stock samples, and the crosses represent data for solid residue samples.

In this example, the various specimens tested had been received from two different refineries. The characteristics of these samples varied greatly. Some were liquid, and some were solid at room temperature. In such a wide variety of samples, the carbon-hydrogen ratio varied widely. In making the tests, the samples were poured into vessels, and menisci of different shapes were obtained. Furthermore, in some cases the levels of the menisci were altered during the test because of the heating effect of the X-rays. Thus the spacing from the surface of the sample to the various parts of the spectrometer, including the X-ray source and the monochromators, varied not only from sample to sample, but even for a particular sample, while the test was being made.

It is to be noted that in this case the wide scatter of the data represented by measuring the intensity of the vanadium $K\alpha$ line is greatly reduced when the ratio of the intensity of the vanadium $K\alpha$ line to the intensity of the monitoring line is employed.

By making such a ratio measurement on an unknown sample from either refinery, an accurate measurement of the vanadium concentration is obtained from Fig. 11B. For example, when the ratio measurement is 0.60, the calibration curve of Fig. 11B indicates that about 65 parts of vanadium are present in 1,000,000 parts of the gangue regardless of whether the sample is from feed stock or from residue.

GENERAL REMARKS

From the foregoing examples, it is apparent that this invention results in an improvement in the accuracy of the determination of the concentration of an analyte in a chemical mixture under a wide variety of circumstances and without requiring complex mathematical computations. Generally speaking, in order to determine the concentration of a specific component in a test sample of a mixture, one or more reference samples of similar mixtures containing known concentrations of the analyte are prepared or otherwise obtained. Both the test sample and at least one of the reference samples are tested under similar conditions by the ratio method described above, and the ratio measurements obtained for the test sample are compared with the ratio measurements obtained with one or more reference samples in order to determine the concentration of the analyte in the test sample. When a poorly regulated power supply is employed to energize the electron beam that generates the X-rays, it is desirable to employ a monitor line that has a wavelength that is not very far from the wavelength of the analyte line. Generally speaking, however, a well regulated power supply is available, and for this reason a wide difference in wavelength may exist between the analyte line and the monitor line.

Even though it may be difficult to establish a perfect or complete theory for the operation of this invention, and even though it may sometimes be difficult to select wavelength values experimentally for which the ratio of the intensity of the analyte beam compared with the intensity of the monitor beam in a particular set of related samples depends only on the concentration of the analyte; nevertheless by employing ratio measurements in the determination of the concentration of an analyte, more accurate determination of the analyte concentration is possible. Furthermore, it is to be noted that the ratio measurement can be made substantially independent of any errors in the size of the particles to which a solid sample is ground and also substantially free of errors in positioning of the sample and also simultaneously substantially free of minor fluctuations in the energy of the electron beam that generates the X-rays. It is therefore clear that by the employment of ratio measurements in accordance with this invention, the time required to analyze samples and the cost of such analyses are greatly reduced.

While the invention has been described only with reference to specific apparatus and specific examples, it is apparent that it may be applied with other types of apparatus and to other examples without departing from the principles of the invention. It is therefore to be understood that various changes which will now suggest themselves to those skilled in the art may be made in the choice of wavelengths, in the choice of instruments, and in the choice of steps employed in the method of this invention without departing from the invention as defined by the following claims.

The invention claimed is:

1. In a system for determining the concentration of an element in a test sample of a mixture of chemicals by measuring the strength of X-rays emitted from the element forming only a part thereof, the improvement which comprises exposing said test sample to a heterochromatic beam of X-rays some of which fall within an X-ray absorption region of said element, monochromatizing X-rays emerging from said sample at a first wavelength characteristic of the fluorescent X-ray emission spectrum of said element to provide a first monochromatic X-ray beam, monochromatizing X-rays scattered from said sample at a wavelength different from any wavelength characteristic of the emission spectrum of said element to provide a second monochromatic X-ray beam, separately detecting both monochromatic X-ray beams, making a measurement of the ratio of intensities of said detected X-ray beams, similarly making a measurement of such ratio for at least one related sample containing a known concentration of said element, and comparing said measurements to ascertain the concentration of said element in said test sample.

2. In a system for determining the concentration of an element in a mixture of chemicals by measuring the strength of X-rays emitted from the element and in which said strength is subject to variation because of changes in a factor other than such concentration, the improvement which comprises exposing a sample of said mixture to a heterochromatic beam of X-rays some of which fall within an X-ray absorption region of said elements, monochromatizing X-rays emerging from said sample at a first wavelength characteristic of the fluorescent X-ray emission spectrum of said element to provide a first monochromatic X-ray beam, monochromatizing X-rays scattered from said sample at a wavelength different from any wavelength characteristic of the emission spectrum of said element to provide a second monochromatic X-ray beam, selecting said different wavelength so that the ratio of the intensities of said two beams varies with said concentration but not with said factor, separately detecting both monochromatic X-ray beams, making a measurement of the ratio of intensities of said detected X-ray beams, similarly making a measurement of such ratio for at least one related sample containing a known concentration of said element, and comparing said measurements to ascertain the concentration of said element in said test sample.

3. In a system for determining the concentration of an element in a test sample comprising a mixture of chemicals by measuring the strength of X-rays emitted from the element, the improvement which comprises obtaining a set of reference samples comprising mixtures comparable with said test mixture and containing known concentrations of said element, exposing samples of each of said mixtures to a heterochromatic beam of X-rays to cause some of said beam to be absorbed by said element and to cause part of said beam to be scattered by said mixture, monochromatizing X-ray radiation emerging from each said sample at a wavelength characteristic of the fluorescent X-ray emission spectrum of said element to provide a monochromatic X-ray beam, detecting said monochromatic X-ray beam emerging from each sample, detecting such scattered X-rays emerging from each sample, making a measurement of the ratio of intensity of said detected monochromatic X-ray beam compared with the intensity of said detected scattered X-rays, and determining the concentration of said element in said test mixture by comparing the ratio measurement obtained for said test sample with the ratio measurements obtained for said reference samples.

4. In a system for determining the concentration of an element in a test sample comprising a mixture of chemicals by measuring the strength of X-rays emitted from the element, the improvement which comprises obtaining a set of reference samples comprising mixtures comparable with said test mixture and containing known concentrations of said element, exposing samples of each of said mixtures to a heterochromatic beam of X-rays to cause some of said beam to be absorbed by said element and to cause part of said beam to be scattered by said mixture, monochromatizing X-ray radiation emerging from each said sample at a wavelength characteristic of the fluorescent X-ray emission spectrum of said element to provide a monochromatic X-ray beam, detecting said monochromatic X-ray beam emerging from each sample, detecting such scattered X-rays emerging from each sample, making a measurement of the ratio of intensity of said detected monochromatic X-ray beam compared with the intensity of said detected scattered X-rays, plotting the ratio measurements obtained for said reference samples as a function of said known concentrations to produce a graph representing the manner in which the ratio measurement for such samples varies as a function of concentration of said element, and determining the concentration of said element in said test mixture by comparing the ratio measurement obtained for said test sample with a ratio measurement represented by said graph.

5. In a system for qualitatively determining the concentration of an element in a test sample of a mixture of chemicals by measuring the strength of X-rays emitted from the element forming only a part thereof, the improvement which comprises exposing said test sample to a heterochromatic beam of X-rays some of which fall within an X-ray absorption region of said element, monochromatizing X-rays emerging from said sample at a first wavelength characteristic of the fluorescent X-ray emission spectrum of said element to provide a first monochromatic X-ray beam, monochromatizing X-rays emerging from said sample at a wavelength characteristic of the scattered X-rays and different from any wavelength characteristic of the fluorescent emission spectrum of said element to provide a second monochromatic X-ray beam, separately detecting both monochromatic X-ray beams, and making a measurement of the ratio of intensities of said detected X-ray beams.

6. In a system for quantitatively determining the concentration of an element in a test sample of a mixture of chemicals by measuring the strength of X-rays emitted from the element forming only a part thereof, the improvement which comprises exposing said test sample to a heterochromatic beam of X-rays some of which fall within an X-ray absorption region of said element, monochromatizing X-rays emerging from said sample at a first wavelength characteristic of the fluorescent X-ray emission spectrum of said element to provide a first monochromatic X-ray beam, monochromatizing later X-rays scattered from said sample at a wavelength characteristic of scattered X-rays and different from any wavelength characteristic of the fluorescent emission spectrum of said element to provide a second monochromatic X-ray beam, separately detecting both monochromatic X-ray beams, and making a measurement of the ratio of intensities of said detected X-ray beams whereby the concentration of said element in said sample may be ascertained by comparing said ratio measurement with another ratio measurement characteristic of a sample of known composition.

7. In a system for detecting differences in the concentration of an element in a series of samples of mixtures of chemicals by measuring the strength of X-rays emitted from the element in each sample, the improvement which comprises exposing samples of each of said mixtures to a heterochromatic beam of X-rays to cause some of said beam to be absorbed by said element and to cause part of said beam to be scattered by said mixture, monochromatizing X-ray radiation emerging from each said samples at a first wavelength characteristic of the fluorescent X-ray emission spectrum of said element to provide a monochromatic X-ray beam, detecting said monochromatic X-ray beam emerging from each sample, detecting such scattered X-rays emerging from each sample, making a measurement of the ratio of intensity of said detected monochromatic X-ray beam compared with the intensity of said detected scattered X-rays, and comparing the ratio measurements to determine differences in the concentrations of said element in the various samples.

8. In a system for determining the concentration of an element in a mixture of chemicals by measuring the strength of X-rays emitted from the element, the improvement which comprises exposing a sample of said mixture to a heterochromatic beam of X-rays to cause part of said beam to be absorbed by said element and to be re-emitted by fluorescence as fluorescent emission radiation that is characteristic of said element and to cause an unabsorbed part of said beam to be scattered by said sample, selectively detecting X-rays emerging from said sample in accordance with the wavelength characteristics of the fluorescent emission radiation that is characteristic of said element, selectively detecting X-rays scattered from said sample in accordance with wavelengths different from any wavelength characteristic of the fluorescent emission radiation that is characteristic of said element, making a measurement of the ratio of the intensity of the former selectively detected X-rays compared with the intensity of the latter selectively detected scattered X-rays, similarly making a measurement of such ratio for at least one related sample containing a known concentration of said element, and comparing said measurements to ascertain the concentration of said element in said test sample.

9. In a system for detecting differences in the concentration of an element in a series of mixtures of chemicals by measuring the strength of X-rays emitted from the element, the improvement which comprises exposing a sample of each said mixture to a heterochromatic beam of X-rays to cause part of said beam to be absorbed by said element and to be re-emitted by fluorescence as emission radiation that is characteristic of said element and to cause an unabsorbed part of said beam to be scattered by said sample, selectively detecting said characteristic emission radiation emitted by fluorescence from each sample in preference to such radiation scattered from said each sample, selectively detecting such scattered X-rays emitted from each sample in preference to such emission radiation emitted by fluorescence, making a measurement of the ratio of the intensity of said selectively detected characteristic emission radiation compared with the intensity of said selectively detected scattered X-rays emerging from each sample, and comparing the measurements of said ratio to determine whether there is a difference in the concentrations of said element in said samples.

10. In a system for determining the concentration of an element in a mixture of chemicals by measuring the strength of X-rays emitted from the element, the improvement which comprises exposing a sample of said mixture to a heterochromatic beam of X-rays to cause a part of said beam to be absorbed by said element and to be re-emitted as fluorescent emission radiation that is characteristic of said element and to cause an unabsorbed part of said beam to be scattered by said sample, separately detecting such scattered X-rays emitted from said sample in preference to such fluorescent emission radiation, separately detecting said characteristic fluorescent emission radiation emitted from said sample in preference to the radiation scattered from said sample, and making a measurement of the ratio of the intensity of said detected characteristic fluorescent emission radiation compared with the intensity of said detected scattered X-rays emerging from each sample.

11. In a system for determining the concentration of an element in a test sample of a mixture of chemicals by measuring the strength of X-rays emitted from the element, the improvement which comprises exposing a sample of said mixture to a heterochromatic beam of X-rays to cause part of said beam to be absorbed by said element and to be re-emitted as fluorescent emission radiation that is characteristic of said element and to cause an unabsorbed part of said beam to be scattered by said sample, separately detecting such scattered X-rays emitted from said sample in preference to such fluorescent emission radiation, separately detecting said characteristic fluorescent emission radiation emitted from said sample in preference to the radiation scattered from said sample, making a measurement of the ratio of the intensity of said detected characteristic emission radiation compared with the intensity of said detected scattered X-rays emerging from each sample, similarly making a measurement of such ratio for at least one related sample containing a known concentration of said element, and comparing said measurements to ascertain the concentration of said element in said test sample.

12. In a system for determining the composition of a sample, the combination of: means for supporting a sample in a test zone; means including a source of heterochromatic X-rays for directing such heterochromatic X-rays toward said sample in said test zone, whereby X-rays of one wavelength that is characteristic of a component of said sample are emitted from said sample by fluorescence from the same side of said sample as that from which said sample is irradiated by said X-ray source, and whereby some of said heterochromatic radiation of a second wavelength is scattered by components of said sample from the same side of said sample as that from which said sample is irradiated; a first detector; a first monochromator positioned and oriented for selectively transmitting such fluorescent radiation from said same side of said sample to said first detector; a second detector; a second monochromator positioned and oriented for selectively transmitting such scattered radiation that is emitted from said same side of said sample to said second detector; and means controlled by said first detector and said second detector in accordance with the intensity of said detected fluorescent radiation and the intensity of said detected scattered radiation for measuring the intensity of the detected fluorescent radiation in relationship to the intensity of the detected scattered radiation.

13. In a system for determining the composition of a sample, the combination of: a sample supported in a test zone; means including a source of heterochromatic X-rays for directing such heterochromatic X-rays toward said sample in said test zone, whereby X-rays characteristic of a component of said sample are emitted from said sample by fluorescence from the same side of said sample as that from which said sample is irradiated by said X-ray source and whereby some of said heterochromatic radiation is simultaneously scattered by components of said sample from the same side of said sample as that from which said sample is irradiated; first means selectively responsive to such fluorescent radiation in preference to said scattered radiation, said first means being positioned and oriented to separately receive and detect such fluorescent radiation from the same side of said sample; second means selectively responsive to such scattered radiation in preference to said fluorescent radiation, said second means being positioned and oriented to separately receive and detect such scattered radiation that is emitted from said same side of said sample; and means controlled by said first means and said second means in accordance with the intensity of radiation detected by the respective means for measuring the intensity of the detected fluorescent radiation in relationship to the intensity of the detected scattered radiation.

14. In a system for determining the composition of a sample, the combination of: a sample supported in a test zone; means including a source of heterochromatic X-rays for directing such heterochromatic X-rays toward said sample in said test zone, whereby X-rays characteristic of one component of said sample are emitted from an area of said sample by fluorescence from the same side of said sample as that from which said sample is irradiated by said X-ray source and whereby some of said heterochromatic radiation is scattered by components of said sample through the same area of said sample from the same side of said sample as that from which said sample is irradiated; first means for selectively detecting radiation emerging from the same side of said sample in accordance with the wavelength properties of fluorescent radiation emitted by said element; second means for selectively detecting radiation emerging from the same side of said sample and scattered by said components; and means controlled by said first means and said second means for measuring the intensity of the detected fluorescent radiation in relationship to the intensity of the detected scattered radiation.

References Cited in the file of this patent

UNITED STATES PATENTS

| | | |
|---|---|---|
| 2,318,667 | Bruce | May 11, 1943 |
| 2,442,752 | Armstrong | June 8, 1948 |
| 2,532,810 | Harker | Dec. 5, 1950 |
| 2,602,142 | Meloy | July 1, 1952 |
| 2,635,192 | Cordovi | Apr. 14, 1953 |

FOREIGN PATENTS

| | | |
|---|---|---|
| 506,022 | Great Britain | May 22, 1939 |